Patented Dec. 5, 1950

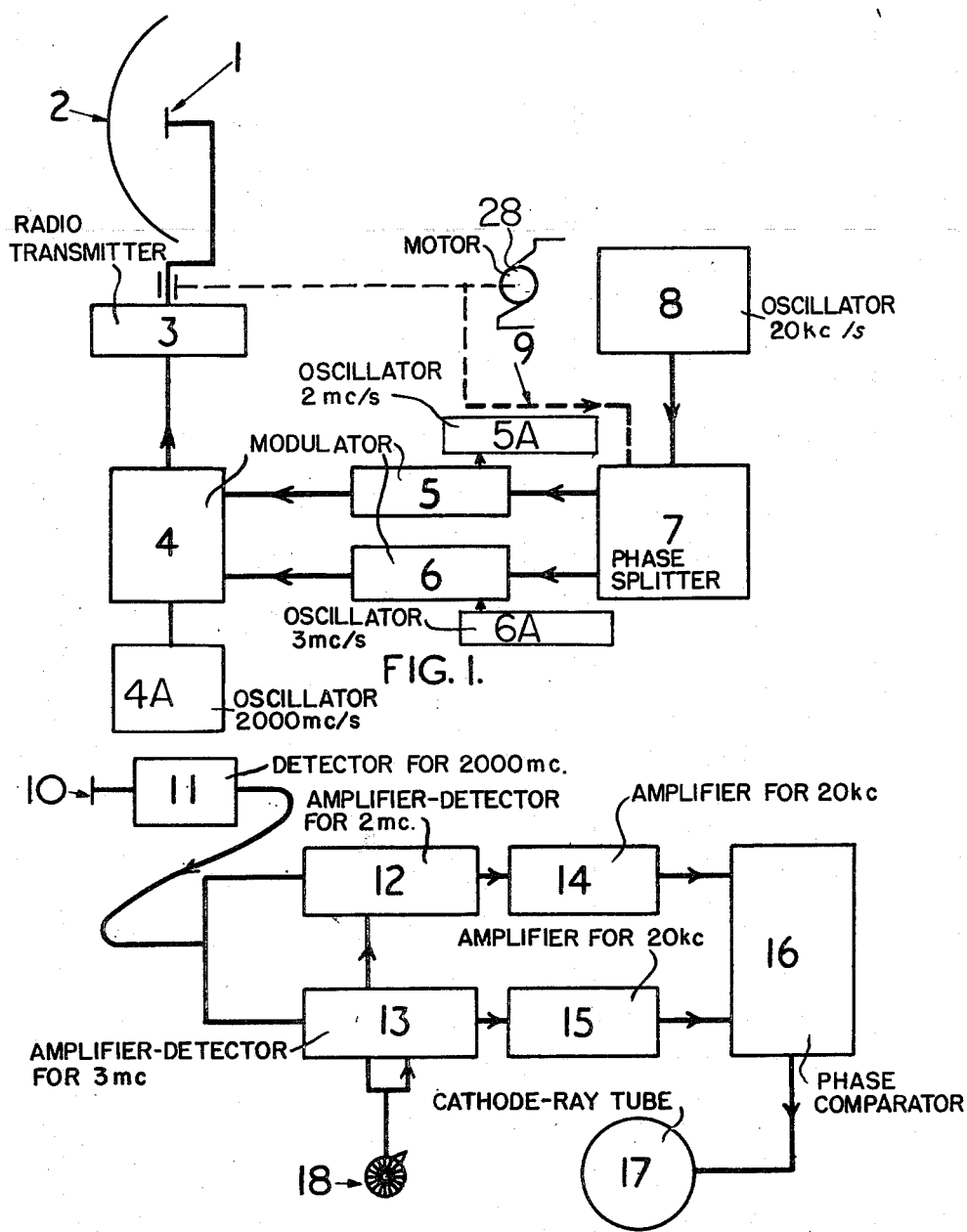

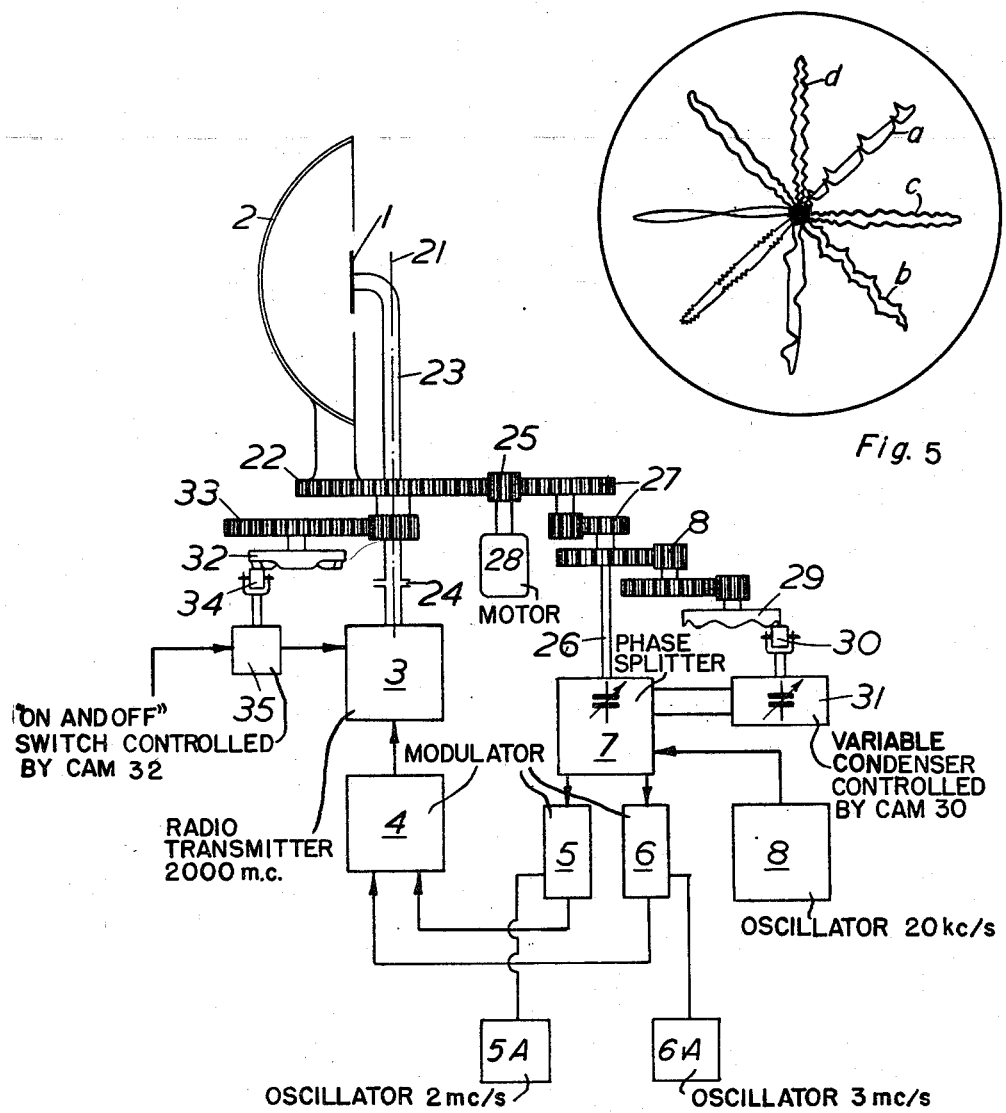

2,532,939

UNITED STATES PATENT OFFICE 2,532,939

RADIO BEACON

John W. S. Pringle, Cambridge, England

Application July 25, 1947, Serial No. 763,671
In Great Britain April 23, 1945

Section 1, Public Law 690, August 8, 1946
Patent expires April 23, 1965

13 Claims. (Cl. 343—106)

This invention concerns improvement in radio beacons for navigational purposes of the kind sometimes referred to as radio light-houses, i. e. beacons emitting a highly directional beam which rotates or oscillates in azimuth, the navigator of a ship or other mobile craft determining his position from information conveyed to him at the time that the beam sweeps over a receiving system installed in the craft.

The object of the invention is to provide an improved means for conveying the information by modulation of the beacon transmitter and to provide improved receiving equipment for installation in a ship or like craft for use with the improved transmitter.

The transmitter according to the invention is characterised by the feature that it emits a carrier-wave modulated by two different signals whose phase difference corresponds to the instantaneous position of the beam with reference to some fixed direction, e. g. true north. These modulating signals may be applied either continuously or periodically and they may be either inside or outside the audio-frequency band. Each degree of phase difference may correspond to one degree of movement in azimuth, particularly when the beam rotates continuously. The modulating signals may modulate sub-carriers which are in turn superimposed on the carrier proper.

The width of the beam is preferably as small as possible (say 6° between the half-amplitude points) and the beam is preferably rotated continuously, say at 12 revolutions per minute. In a preferred form the carrier frequency is of the order of 2,000 mc./s., the modulating signals have a frequency of approximately 20 kc./s. and the two latter signals are superimposed upon two sub-carriers of, say 2 mc./s. and 3 mc./s.

The receiver according to the invention comprises means for detecting and indicating the phase difference between the two modulating signals. In the preferred form the phase difference is indicated by a cathode ray tube.

In order that the invention may be more readily understood embodiments thereof will now be described with reference to the accompanying drawings in which:

Figure 1 is a block diagram of a suitable form of transmitter,

Figure 2 is a block diagram of a suitable receiver,

Figures 4 and 5 show cathode ray tube displays,

Figure 6 is a schematic diagram, partly in block form, of a modified transmitter arrangement provided with means for assisting its identification at the receiver in the mobile craft.

Figure 4:
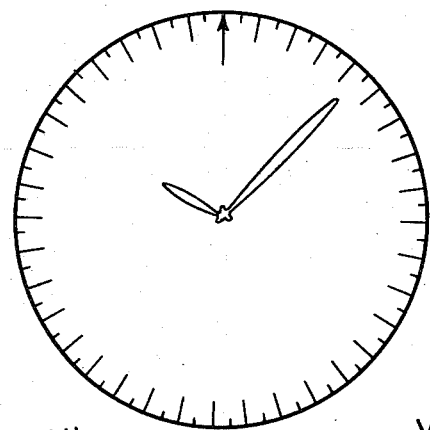

Referring to Figure 1, I is a dipole mounted in a parabolic reflector 2 and fed from a transmitter 3 operating at a frequency of, say, 2000 mc./s. This transmitter is driven by as oscillator 4A operating at the chosen frequency of, say, 2,000 mc./s. and whose output is modulated by a modulating device 4 which receives two sub-carrier frequencies of, say 2 mc./s. and 3 mc./s. from modulating amplifiers 5, 6. Each of these amplifiers is modulated by a unit 7 which receives a frequency of, say, 20 kc./s. from a suitable source 8. As indicated by the dotted line 9 the unit 7 is mechanically coupled to the driving gear (not shown in detail) for the aerial arrangement 1, 2 which is driven at a suitable speed of rotation by a motor 28. The coupling is such that the modulations applied to the two amplifiers 5, 6 have a phase-difference which is determined by the instantaneous direction of the beam emitted by the aerial system 1, 2. The amplifiers 5 and 6 are respectively driven by oscillators 5A and 6A.

When, as will frequently be the case, the aerial arrangement 1, 2 rotates in azimuth continuously, the phase-difference between the modulations applied to the two amplifiers 5, 6 by the unit 7 under the control of the aerial arrangement is preferably one degree for every degree of movement of such aerial in its azimuth, that is to say, assuming true north to be the chosen fixed reference direction, the phase-difference when the aerial is positioned with its beam directed due east will be 90 degrees, when due south 180 degrees and so on.

The receiver used in the craft shown in Figure 2 utilises an omni-directional aerial 10 which is coupled to a crystal detector, or other convenient detector, shown at 11. The output from the detector is supplied to two amplifier-detectors 12, 13 by which the sub-carriers are separately amplified and the modulating signals extracted. One of these amplifier-detectors is designed to handle the 2 mc./s. output from the detector 11 and the other handles the output at 3 mc./s. The 20 kc./s. outputs from the two units 12, 13 are then separately amplified at units 14 and 15 and applied to a phase comparator 16 which in turn feeds a cathode ray tube 17. 18 indicates a control for simultaneously altering the gains of the two units 12, 13 by like amounts.

The various parts of both the transmitter and the receiver so far described may be of any suitable known form. For example, the aerial arrangement comprising dipole 1 and reflector 2 may follow the form of rotatable devices now well known in connection with radar and similar U. H. F. or microwave equipment. The transmitter 3 and driving oscillator 4A may likewise follow the general design of U. H. F. or microwave equipment adapted for continuous rather than pulsed operation and may employ either conventional thermionic valves or velocity-modulated valves or magnetron valves as the oscillator power source. The actual transmitter may be constructed so as to rotate in unison with the aerial arrangement or alternatively and, as shown, may be stationary and its R. F. power output conducted to the aerial by way of a suitable and, again, well known, form of rotating joint either in a coaxial or other form of transmission cable or in a waveguide.

The aerial arrangement is conveniently rotated or oscillated in the azimuth direction about its mounting axis, by suitable driving means such as the electric motor 28 operating through gearing or cam mechanism. This driving means also operates, through the mechanical coupling 9, which may again be a gear-train or cam mechanism, the phase-controlling means within the unit 7 by which the phase-relationship between the two oscillatory voltages derived from an oscillator in the unit 8 is varied in accordance with the position of the aerial at any moment. Such phase-controlling means may, again, be of any suitable form. For example, a continuously variable phase adjusting circuit using a phase-splitting networks in association with ganged variable condensers as described in F. E. Terman's "Radio Engineers Handbook," 1943, at page 949 may be inserted in the connections between the oscillator 8 and one of the modulating amplifiers 5, 6 and the other of such modulating amplifiers arranged to be fed directly from such oscillator 8. Alternatively a separate phase shifting network may be included in each of the connections between the oscillator 8 and the modulating amplifiers 5, 6 and their respective control members arranged for movement by the coupling 9 in opposing sense, i. e. so that one introduces a phase-lag while the other introduces a phase-lead.

In the mobile craft receiver the amplifier-detector units 12, 13 follow normal radio receiver practice, being adapted respectively to deal with the 2 and 3 mc./s. components with equal degrees of amplification in each channel. The units 14 and 15 likewise follow normal amplifier practice but with particular attention to affording equalised amplitude outputs and with virtually identical values of any phase-displacement caused therein.

Figure 3:
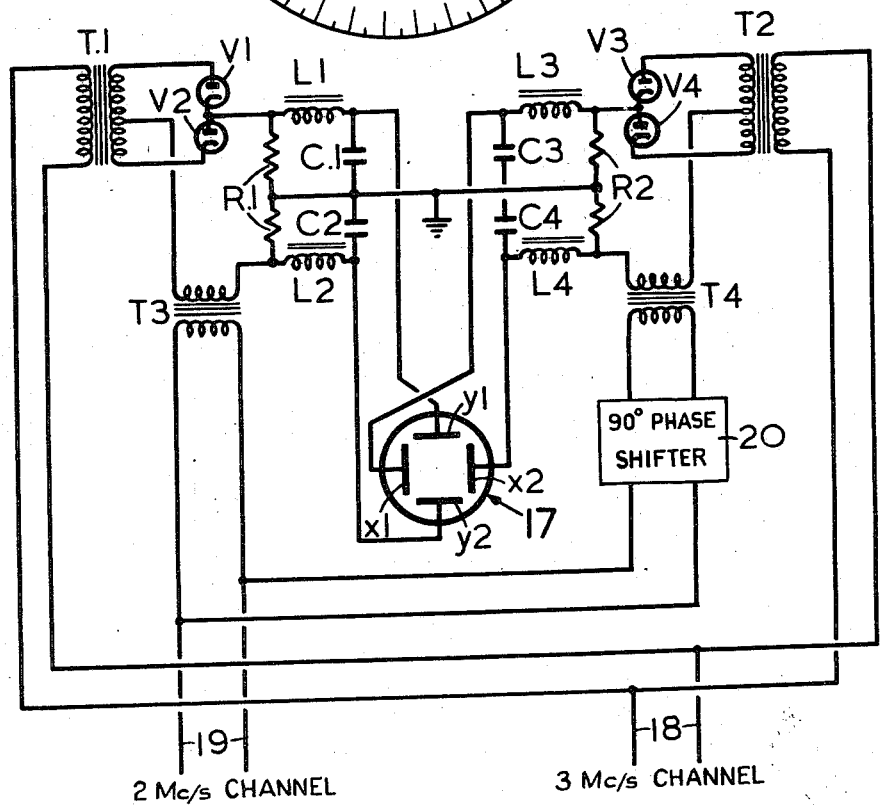
Figure 3 is a circuit diagram of the phase comparator used in the receiver.

The phase-comparator circuit of unit 16 may again be of any suitable form but a convenient form thereof is that shown in Figure 3 and described in the British Post Office Engineering Department's Radio Report No. 1206. Briefly this comparator circuit comprises two input transformers $T_1$, $T_2$ whose primary windings are supplied, in parallel, from the input leads 18 carrying the resolved 20 kc./s. output from one of the amplifier units 14 or 15. Two further input transformers $T_3$, $T_4$ have their primary windings supplied, in parallel, from the input leads 19 carrying the resolved 20 kc./s. output from the other one of the units 14, 15, the transformer $T_4$ however being supplied by way of a phase-shifting network 20 which serves to impart a 90° phase displacement relative to the transformer $T_3$.

The secondary windings of the transformers $T_2$, $T_2$ are centre-tapped and between this centre tap and one end of an associated load resistance $R_1$ or $R_2$ is connected the secondary winding of the related transformer $T_3$ or $T_4$. The outer terminals of the secondary windings of transformers $T_1$ and $T_2$ are shunted respectively by serially connected diode pairs $V_1$, $V_2$ and $V_3$, $V_4$, the junction between the diodes of each pair being connected to the other end of the associated load resistance $R_1$ or $R_2$ as shown.

The potentials developed across the load resistance $R_1$ are applied to the deflection plates $y_1$, $y_2$ of the cathode ray tube 17 by way of a smoothing circuit or filter $L_1$, $C_1$, $L_2$, $C_2$ while the potentials developed across the other load resistance $R_2$ are similarly applied to the deflection plates $x_1$, $x_2$ of the cathode ray tube by way of the smoothing circuit or filter $L_3$, $C_3$, $L_4$, $C_4$. A push-pull or balanced deflection system is afforded by the connection to a common, and, preferably earthed, point of the mid-points of the load resistance $R_1$ and $R_2$ and the condenser pairs $C_1$, $C_2$ and $C_3$, $C_4$. The power supplies and other ancillary circuits for the cathode ray tube follow normal practice and are accordingly not shown.

Provided proper precautions are taken in the design of the amplifiers for the sub-carriers, this arrangement will give deflections in the direction of the $x$ and $y$ axes of the cathode ray tube which are proportional to $E^2 \cos \theta$ and $E^2 \sin \theta$ respectively, where E is the field strength of the received signal and $\theta$ is the phase difference between the two 20 kc./s. modulations. Thus the radial displacement of the luminous spot produced on the screen of the cathode ray tube is proportional to the square of the field strength of the received radio-frequency signals, and the direction of displacement to the phase difference between the modulations carried by each signal. As the rotating transmitter beam passes over the receiver the spot will trace out a pattern related to the polar diagram of the transmitting aerial, and the main lobe will serve as a pointer indicating the true bearing of the craft from the beacon.

The display obtained on the cathode ray tube with the above arrangement will be as shown in Figure 4 will illustrates the results obtained from two beacons at bearing angles of 43° and 303° respectively.

Side lobes in the polar diagram appear in their correct relation to the main lobe and may easily be distinguished. They will be smaller than in the actual polar diagram owing to the square-law property of the system. Spurious reflections from objects off the direct line between the receiver and transmitter may produce lobes in false directions, but they can normally be distinguished by their greater width, owing to the finite size of the re-radiating object. Objects on or near the direct line between receiver and transmitter should produce merely on asymmetry in the main lobe pointer, and serious asymmetry indicates that the bearing is unreliable. It is highly improbable that incorrect results will be obtained from any indication showing the correct regular pattern: the use of a cathode ray tube for display therefore removes one of the main difficulties found with radio direction finding methods which rely on an audible presentation.

Two possible methods are available for identification of an individual beacon from out of a plurality of similar beacons located at known fixed points, all using the same fundamental radio transmission frequency and forming part of a navigational aiding system covering a chosen wide area.

Since the lobe pointer will appear on the display each time the radio beam passes over the ship or aircraft, the interval between successive indications may be varied by varying the speed of rotation of the transmitting aerial. By suppressing the transmission during certain cycles of rotation, a "group flash" characteristic may be obtained similar to that given by the usual visual form of lighthouse. The full number of light codes commonly employed cannot, however, easily be reproduced, owing to the difficulty of varying the duration of the flash without increasing the total time of rotation. An imitation of the code can, however, be obtained by combining this identification method with a second method of identification which gives a characteristic pattern of "hieroglyphic" on the cathode ray tube on each cycle of revolution of the beam. This is obtained by introducing a controlled "wobbulation" or temporary departure from the assigned law relating to the rotation of the aerial and the phase-control mechanism. The amplitude, speed and character of this "wobbulation" can be varied by suitable means, such as by set cams to give a series of characteristic lobe patterns on the display of the type shown in Figure 5. Enough hieroglyphics can probably be derived in this way to avoid any risk of confusion of identification between lighthouses in any one part of the country or other area in use at one time by any given craft, and by combination of this method with the "group flash" method outlined above, a different characteristic signal could be obtained for a very considerable number of lighthouses.

Figure 6 illustrates diagrammatically a modified transmitter arrangement embodying means for providing identification as outlined above. In this arrangement the aerial arrangement comprises a dipole 1 mounted as before in a parabolic reflector or mirror 2 disposed for continuous rotation about a vertical axis 21 upon a platform having a toothed periphery 22. The dipole 1 is supplied with energy from the transmitter 3, which is stationary by way of a waveguide 23 provided with a rotating choke-joint 24.

The toothed periphery 22 is engaged by a small pinion 25 on the driving shaft of an electric motor 26 which is continuously energised whereby the aerial arrangement is continuously rotated with its beam sweeping in the azimuth plane. The transmitter 3, driven by an oscillator 4A, is modulated as before by a modulating device 4 which receives two sub-carrier frequencies from the modulating amplifiers 5, 6. Each of these modulating amplifiers is driven respectively by its associated oscillator 5A, 6A and is modulated, again as before, by an input oscillation derived from an oscillator 8 and supplied by way of a phase splitting unit.

The motor pinion 25 also drives a shaft 26 through a gear train 27 of such construction that said shaft 26 rotates at the same speed as and in precise timed relationship with the aerial 1, 2. This shaft 26 controls the operation of means, such as a variable condenser, within the unit 7 whereby the phase displacement between the two versions of the oscillation from unit 8, used to modulate the sub-carrier frequency oscillations in the modulating amplifiers, 5, 6, progressively increases from zero through 90°, 180° and 270° back to 360° or zero in unison with the sweep of the beam of the aerial through similar bearing angles.

Driven from the gear train 27 through a further gear train 28 of suitable step-up ratio is a cam element 29 engaged by a follower 30 which controls, by its movement, a small auxiliary condenser or other phase modifying means 31 associated with the main phase-varying means of the unit 7. This auxiliary means 31 serves to superimpose a periodic fluctuation, e. g. a small amount of phase-delay or phase-advance or both alternately, upon the particular value assigned by the main phase-varying means during every few degrees of azimuth movement of the aerial.

By varying the contour of the cam element 29 a variety of different signal presentations upon the receiver cathode ray tube may be obtained. For example, by the use of a cam which provides a series of short but spaced auxiliary phase-delay periods the series of sharp anti-clockwise directed pips as shown at $a$ in Figure 5 may be provided. Similarly a series of short spaced periods of alternate phase-delay and phase-advancement will provide the form shown at $b$ in Figure 5. A continuous and substantially sinusoidal variation by the cam element 29 will provide a display as shown at $c$ while a saw-tooth variation is indicated at $d$. The other variants illustrated will be obvious in their manner of attainment from the description so far given.

For effecting periodic suppression of the transmitted beam during chosen cycles of the aerial rotation a further controlling cam 32 is driven from the aerial arrangement through a reduction gear train 33. This cam is engaged by a follower 34 controlling a switch 35 in the supply leads of one of the essential power supplies, e. g. the high-tension supply to the transmitter 3. By suitable configuration of the cam 32 the transmitter 3 may be made operative during chosen cycles of the aerial rotation and inoperative during others to provide further means of identification in the manner already described.

As will be evident to those well versed in the art numerous modifications both in the construction of the beacon transmitter and the mobile craft receiver are possible. Further means of identification between the respective beacons of a series may be obtained by the use of different fundamental transmission frequencies therefor but in the interests of simplicity of construction and operation of the mobile craft apparatus a common transmission frequency is preferred.

I claim:

1. In a radio beacon, a directional antenna mounted for rotation about a vertical axis, a radio transmitter operating at a predetermined frequency and connected to and feeding said antenna, a modulator for modulating said transmitter at two different radio frequencies, first and second oscillators respectively operating at the last-named frequencies for supplying modulating currents at said frequencies to said modulator, another oscillator operating at a frequency lower than all of the hereinbefore mentioned frequencies, a phase splitter having an input circuit connected to the output of the last-named oscillator, said phase-splitter including two output circuits respectively connected to modulate the outputs of said first and second oscillators, said phase-splitter also including a movable element for varying the phase of the current fed through one of said output circuits relative to the phase of the current fed through the other of said output circuits upon predetermined movement of the movable element, a driving element mechanically connected to said antenna for rotating the same, and another driving element coupled to the first one for imparting said predetermined movement to said movable element to such an extent as to effect a shift of one electrical degree in the phase relationship of said currents respectively modulating the outputs of said first and second oscillators when the antenna rotates one angular degree.

2. The method of producing a radio beacon signal which includes generating radio frequency waves, concentrating the waves into a beam, rotating the beam about a vertical axis, modulating the waves by two sub-carriers of different radio frequencies, modulating the two sub-carriers at a frequency lower than any of the above-mentioned frequencies, and varying the phase relationship of the modulations thus applied to the two sub-carriers by values which vary with and depend upon the angular position of said beam.

3. The method of producing a radio beacon signal which includes generating radio frequency waves, concentrating the waves into a beam, rotating the beam about a vertical axis, modulating the waves by two sub-carriers of different radio frequencies, modulating the two sub-carriers at a single high frequency which is lower than any of the above-mentioned frequencies, varying the phase relationship of the modulations thus applied to the two sub-carriers by values which vary with and depend upon the angular position of said beam, and further varying the said phase relationship by amounts considerably smaller than the first-named variation repeatedly through complete cycles for every few angular degrees of rotation of the beam.

4. In a radio beacon, a directional antenna, a radio transmitter operating at a predetermined carrier frequency for feeding said antenna, a modulator for modulating said transmitter, said modulator including two oscillators operating at different frequencies and at frequencies both below said carrier frequency, additional modulating means for modulating the outputs of said oscillators at a given frequency, movable means operable upon movement to vary the phase relationship between the said modulations of the outputs of said oscillators, and means for synchronously rotating said antenna and moving said movable means.

5. In a radio beacon, a directional antenna, a radio transmitter having a predetermined carrier frequency for feeding said antenna, a modulator for modulating said transmitter and applying thereto two sub-carriers, said modulator including two oscillators operating at different radio frequencies both lower than said carrier frequency, a modulator for further modulating each of said sub-carriers at a single frequency, and a variable reactor connected in the output of the last-named modulator to vary the phase of the modulation applied to one of the sub-carriers relative to that of the other, and means for rotating said antenna, said last-named means including means for varying said reactor to alter said phase relationship to a different predetermined value for each different angular position of said antenna.

6. In a radio beacon, a directional antenna; a radio transmitter for feeding the antenna, said transmitter operating at a predetermined frequency; modulating means for modulating the transmitter; said modulating means comprising two oscillators of different radio frequencies both lower than that of said predetermined frequency, and means to modulate said transmitter with the output signals of both of said oscillators whereby to produce two sub-carriers; an oscillator of lower frequency than the frequency of either of the above-named oscillators; variable reactor means connecting the last-named oscillator to said modulating means and including means to separately modulate the two sub-carriers at the output frequency of the last-named oscillator, said reactor means including a rotatable element for varying the reactance of the reactor means; and means for synchronously rotating the rotatable element and the antenna, said reactor means including means to vary the phase difference between the modulations applied to said two sub-carriers by one electrical degree for each angular degree of rotation of the rotatable element.

7. In a radio beacon, a directional antenna; a radio transmitter for feeding the antenna, said transmitter operating at a predetermined frequency; modulating means for modulating the transmitter; said modulating means comprising two oscillators of different radio frequencies both lower than that of said predetermined frequency, and means to modulate said transmitter with the output signals of both of said oscillators whereby to produce two sub-carriers; an oscillator of lower frequency than the frequency of either of the above-named oscillators; variable reactor means connecting the last named oscillator to said modulating means and including means to separately modulate the two sub-carriers at the output frequency of the last-named oscillator, said reactor means including a rotatable element for varying the reactance of the reactor means; and means for synchronously rotating the rotatable element and the antenna; and a remote receiver whose position is to be determined; said receiver comprising all of the following parts: a detector for detecting the waves received from said transmitter, a pair of detectors connected to the output of the first-named detector for detecting the modulation on each of said sub-carriers, a phase comparator for determining the phase relationship of the modulations on said sub-carriers, and an indicator connected to the phase comparator for indicating said phase relationship.

8. The method of producing a radio beacon signal comprising emitting a confined directional radio frequency beam, rotating the beam continuously about a vertical axis, modulating the radio frequency energy of the beam, varying the modulation characteristics according to the angular displacement of the beam to effect a substantially predetermined modulation characteristic for each angular position of the beam, and further varying the modulation characteristics by small amounts as compared to the variations due to change in angular displacement and at a fast repetition rate as compared with the repetition rate of the first-named variations.

9. A radio beacon comprising a transmitter and an associated directional aerial system movable in azimuth, an oscillator generating an original signal, a pair of oscillators generating different sub-carrier frequencies, modulators associated with each of said sub-carrier frequency oscillators, a variable phase-splitting unit receiving the original signal and applying the same to each of said modulators, whereby there are provided two sub-carrier frequencies modulated with the same original signal, a third modulator associated with the transmitter and receiving said two sub-carrier frequencies, and means for moving the aerial system and simultaneously varying the phase-splitting unit to vary the relative phases of the original signal applied to the transmitter in accordance with the instantaneous position of the radiated beam.

10. A radio beacon comprising a transmitter and an associated directional aerial system movable in azimuth, means for generating an original signal, means for mechanically moving the aerial system, electronic means including a variable phase-splitting circuit for providing two versions of the original signal, a coupling between the aerial and the said variable phase-splitting circuit to vary the phase of the two signal versions in accordance with the instantaneous orientation of the aerial, and modulating means associated with the transmitter for applying the two signal versions to the transmitter carrier.

11. A radio beacon comprising a highly directional aerial movable in azimuth, a radio transmitter feeding the said aerial, a modulator for impressing modulation components on the transmitter carrier frequency, means for generating an original signal, a first channel between said signal generator and said modulator, a second channel between said signal generator and said modulator, each of said channels including means for generating a frequency intermediate between that of the original signal and the transmitter carrier frequency and for impressing said original signal on said intermediate frequency, the intermediate frequencies in each channel being different, means for varying the phase of the original signal in one channel with respect to the phase in the other channel, and a coupling between the aerial and said phase-changing means for varying the relative phase of the original signal components in each channel in accordance with the movement of the aerial.

12. A radio beacon comprising a transmitter and an associated directional aerial system movable in azimuth, an oscillator generating an original signal, a pair of oscillators generating different sub-carrier frequencies, modulators associated with each of said sub-carrier frequency oscillators, a variable phase-splitting unit receiving the original signal and applying the same to each of said modulators, whereby there are provided two sub-carrier frequencies modulated with the same original signal, a third modulator associated with the transmitter and receiving the modulated outputs of said two sub-carrier frequencies, means for moving the aerial system and simultaneously varying the phase-splitting unit to vary the relative phases of the original signal applied to the transmitter in accordance with the instantaneous position of the radiated beam, and means for additionally varying the phase-splitting unit to vary the phase of the said original as applied to the sub-carriers at relatively high speed and between relatively small limits to provide a beacon-identifying signal component.

13. A direction-finding receiver for use with a beacon radiating on a single carrier two versions of the same signal, comprising an omnidirectional aerial system, a detector for extracting two sub-carrier frequencies, separate amplifying and detecting means for each sub-carrier for extracting the modulating signals on each sub-carrier, and an indicator for indicating the instantaneous phase relationship of said last-mentioned signals.

JOHN W. S. PRINGLE.

REFERENCES CITED

The following references are of record in the file of this patent:

UNITED STATES PATENTS

| Number | Name | Date |
| --- | --- | --- |
| 2,129,004 | Greig | Sept. 6, 1938 |
| 2,253,958 | Luch | Aug. 26, 1941 |
| 2,275,320 | Williams | Sept. 30, 1941 |
| 2,368,318 | Muller | Jan. 30, 1945 |
| 2,377,902 | Relson | June 12, 1945 |
| 2,402,410 | Kear | June 18, 1946 |
| 2,420,605 | McConnel | May 13, 1947 |